United States Patent
Feng et al.

(10) Patent No.: US 12,100,955 B2
(45) Date of Patent: Sep. 24, 2024

(54) WIND FARM, HIGH VOLTAGE RIDE THROUGH CONTROL METHOD THEREFOR, SYSTEM, MMC AND MACHINE-SIDE INVERTER

(71) Applicant: XINJIANG GOLDWIND SCIENCE & TECHNOLOGY CO., LTD., Xinjiang (CN)

(72) Inventors: Qita Feng, Beijing (CN); Mingjie Tang, Beijing (CN); Ang Li, Beijing (CN)

(73) Assignee: XINJIANG GOLDWIND SCIENCE & TECHNOLOGY CO., LTD., Xinjiang (CN)

( * ) Notice: Subject to any disclaimer, the term of this patent is extended or adjusted under 35 U.S.C. 154(b) by 14 days.

(21) Appl. No.: 17/758,922

(22) PCT Filed: Sep. 14, 2020

(86) PCT No.: PCT/CN2020/115150
§ 371 (c)(1),
(2) Date: Jul. 15, 2022

(87) PCT Pub. No.: WO2021/143169
PCT Pub. Date: Jul. 22, 2021

(65) Prior Publication Data
US 2023/0047793 A1    Feb. 16, 2023

(30) Foreign Application Priority Data
Jan. 16, 2020    (CN) .......................... 202010046620.4

(51) Int. Cl.
*H02J 3/24*    (2006.01)
*H02J 3/48*    (2006.01)

(52) U.S. Cl.
CPC . *H02J 3/24* (2013.01); *H02J 3/48* (2013.01)

(58) Field of Classification Search
CPC ...................................... H02J 3/24; H02J 3/48
See application file for complete search history.

(56) References Cited

U.S. PATENT DOCUMENTS

2014/0008912 A1*   1/2014   Gupta .................. H02J 3/48
290/44

FOREIGN PATENT DOCUMENTS

| CN | 102355009 A | 2/2012 |
| CN | 104113077 A | 10/2014 |

(Continued)

OTHER PUBLICATIONS

The Extended European Search Report dated May 24, 2023; Appln. No. 20913645.6.

(Continued)

*Primary Examiner* — Sean Gugger
(74) *Attorney, Agent, or Firm* — Frank Gao, Esq.

(57) ABSTRACT

A wind farm, and a method for controlling high voltage ride through, a system, a MMC and a machine-side converter therefor are provided. The method for controlling high voltage ride through control method for the wind farm includes: determining an amplitude of a voltage of a power grid; determining that a high voltage ride through event is occurred under a condition that the amplitude of the voltage of the power grid exceeds a first threshold; acquiring a fundamental frequency modulation wave of the MMC; superimposing a triple harmonic on the fundamental frequency modulation wave to obtain a superimposed modulation wave; and controlling the MMC to operate basing on the superimposed modulation wave.

11 Claims, 6 Drawing Sheets

(56) References Cited

FOREIGN PATENT DOCUMENTS

| | | | |
|---|---|---|---|
| CN | 104242347 A | 12/2014 | |
| CN | 204030631 U | 12/2014 | |
| CN | 104300574 A | 1/2015 | |
| CN | 204179684 U | 2/2015 | |
| CN | 103560520 B | 4/2015 | |
| CN | 104617584 A | 5/2015 | |
| CN | 106611960 A | 5/2017 | |
| CN | 106911133 A | 6/2017 | |
| CN | 107017662 A | 8/2017 | |
| CN | 107069809 A | 8/2017 | |
| CN | 105375523 B | 2/2018 | |
| CN | 108054786 A | 5/2018 | |
| CN | 108107287 A | 6/2018 | |
| CN | 108123485 A | 6/2018 | |
| CN | 109066766 A | 12/2018 | |
| CN | 109088428 A | 12/2018 | |
| CN | 109449996 A | 3/2019 | |
| CN | 109672210 A | 4/2019 | |
| CN | 209072336 U | 7/2019 | |
| EP | 3116087 A1 | 1/2017 | |
| KR | 20150004031 A | 1/2015 | |
| WO | 2012/083963 A1 | 6/2012 | |
| WO | 2015/185566 A1 | 12/2015 | |
| WO | 2017/058253 A1 | 4/2017 | |
| WO | WO-2019197023 A1 * | 10/2019 | ............ H02M 1/32 |

OTHER PUBLICATIONS

Australian Examination Report No. 1; dated Mar. 17, 2023; Appln. No. 2020421890.
First Indian Office Action dated Jan. 2, 2023; Appln. No. 202217041713.
Zhang Chaohua, et al.; "Third Harmonic Injection Control Strategy of Improved Z-Source Inverter", Transactions of China Electrotechnical Society, vol. 24, No. 11, Nov. 2009; 7 pages.
Australian Examination Report No. 2 dated Jul. 18, 2023; Appln. No. 2020421890.
Chilean Office Action dated May 19, 2023; Appln. No. 202201910.
Ali M. Eltamaly; "Novel Third Harmonic Current Injection Technique for Harmonic Reduction of Controlled Converters", Journal of Power Electronics, vol. 12, No. 6; Nov. 2012; 10 pages.
Shengfang Fan, et al; "An Improved Control System for Modular Multilevel Converters with New Modulation Strategy and Voltage Balancing Control", IEEE Transactions on Power Electronics, vol. 30, No. 1, Jan. 2015; 14 pages.
Heythem Hamlaoui, et al; "Interest of storage based STATCOM systems to the power quality enhancement of thyristors based on LCC HVDC links for offshore wind farm", 2018 IEEE International Conference on Industrial Technology (ICIT); IEEE, Feb. 20, 2018; pp. 1702-1707, XP033336901.
EPO Communication dated Mar. 12, 2024; Appln. No. 20 913 645.6.

* cited by examiner

WIND FARM, HIGH VOLTAGE RIDE THROUGH CONTROL METHOD THEREFOR, SYSTEM, MMC AND MACHINE-SIDE INVERTER

CROSS-REFERENCE TO RELATED APPLICATIONS

The present disclosure is a national stage of International Application No. PCT/CN2020/115150, filed on Sep. 14, 2020, which claims priority to Chinese Patent Application No. 202010046620.4, filed on Jan. 16, 2020 and entitled "Method and System for Controlling High Voltage Ride Through, MMC and Machine-Side Converter for Wind Farm", both of which are incorporated herein by reference in their entities.

TECHNICAL FIELD

The present disclosure relates to the technical field of wind power generation, and in particular, to a wind farm, and a method and system for controlling high voltage ride through, a MMC and a machine-side converter therefor.

BACKGROUND

In recent years, flexible Direct Current (DC) transmission technologies based on Modular Multilevel Converter (MMC) have become more and more widely used. Referring to a flexible DC transmission integrated wind farm in FIG. 1, DC wind turbines are connected to a MMC through overhead wires or cables, and the MMC is directly connected to a power grid.

However, in related arts, a transmission distance between the DC wind turbine and the MMC may be tens of kilometers or hundreds of kilometers such that there is no communication therebetween, which makes it difficult to realize control of high voltage ride through of the flexible DC transmission integrated wind farm.

Therefore, a new method and system for controlling high voltage ride through, a MMC and a machine-side converter for a wind farm are urgently needed to enable the flexible DC transmission integrated wind farm to meet requirements of high voltage ride through.

SUMMARY

The embodiments of the present disclosure provide a wind farm, and a method and system for controlling high voltage ride through, a MMC and a machine-side converter therefor, whereby requirements of high voltage ride through of the wind farm can be met.

In a first aspect, an exemplary embodiment of the present disclosure provides a method for controlling high voltage ride through of a wind farm, which is applied in a Modular Multilevel Converter (MMC) connected between Direct Current (DC) buses and a power grid of the wind farm. The method for controlling high voltage ride through includes:
determining an amplitude of a voltage of the power grid;
determining that a high voltage ride through event is occurred under a condition that the amplitude of the voltage of the power grid exceeds a first threshold;
acquiring a fundamental frequency modulation wave of the MMC;
superimposing a triple harmonic on the fundamental frequency modulation wave to obtain a superimposed modulation wave; and controlling the MMC to operate basing on the superimposed modulation wave.

In a second aspect, an exemplary embodiment of the present disclosure provides a method for controlling high voltage ride through of a wind farm, which is applied in a machine-side converter of a wind turbine in the wind farm, wherein the machine-side converter is connected to a MMC through DC buses. The method for controlling high voltage ride through includes:
determining an amplitude of a voltage across DC buses;
determining that a high voltage ride through event is occurred under a condition that the amplitude of the voltage across the DC buses exceeds a second threshold;
calculating a minimum reactive power that the MMC with capability of high voltage ride through needs to absorb basing on the amplitude of the voltage across the DC buses;
calculating a minimum duty ratio allowed by a braking circuit of the machine-side converter with capability of high voltage ride through basing on the minimum reactive power and an apparent power of the MMC; and
controlling the braking circuit to operate basing on a preset duty ratio, wherein the preset duty ratio is greater than or equal to the minimum duty ratio.

In a third aspect, an exemplary embodiment of the present disclosure provides a Modular Multilevel Converter (MMC), wherein the MMC is connected between DC buses and
a power grid of a wind farm. The MMC includes:
a power grid voltage calculation module configured to determine an amplitude of a voltage of the power grid;
a first high voltage ride through determination module configured to determine that a high voltage ride through event is occurred under a condition that the amplitude of the voltage of the power grid exceeds a first threshold;
a fundamental frequency modulation wave acquisition module configured to acquire a fundamental frequency modulation wave of the MMC;
a triple harmonic superposition module configured to superimpose a triple harmonic on the fundamental frequency modulation wave to obtain a superimposed modulation wave; and
a first control module configured to control the MMC to operate basing on the superimposed modulation wave.

In a fourth aspect, an exemplary embodiment of the present disclosure provides a machine-side converter of a wind turbine, wherein the machine-side converter is connected to a MMC through DC buses. The machine-side converter of the wind turbine includes:
a DC bus voltage calculation module configured to determine an amplitude of a voltage across the DC buses;
a second high voltage ride through determination module configured to determine that a high voltage ride through event is occurred under a condition that the amplitude of the voltage across the DC buses exceeds a second threshold;
a minimum reactive power calculation module configured to calculate a minimum reactive power that the MMC with capability of high voltage ride through needs to absorb basing on the amplitude of the voltage across the DC buses;
a minimum duty ratio calculation module configured to calculate a minimum duty ratio allowed by a braking circuit of the machine-side converter with capability of high voltage ride through basing on the minimum reactive power and an apparent power of the MMC; and a second control module configured to control the braking circuit to operate basing on a preset duty ratio, wherein the preset duty ratio is greater than or equal to the minimum duty ratio.

In a fifth aspect, an exemplary embodiment of the present disclosure provides a system for controlling high voltage ride through of a wind farm. The system includes: the MMC as described above and a plurality of machine-side converters as described above.

In a sixth aspect, an exemplary embodiment of the present disclosure provides a wind farm. The wind farm includes: the MMC as described above and a plurality of wind turbines, wherein at least one of the plurality of wind turbines includes the machine-side converter basing on the fourth aspect of the present disclosure or any embodiment thereof.

In a seventh aspect, an exemplary embodiment of the present disclosure provides a computer-readable storage medium having programs stored thereon, wherein the programs includes operation instructions for performing a method for controlling high voltage ride through basing on the first aspect of the present disclosure or any embodiment thereof, or operation instructions for performing a method for controlling high voltage ride through basing on the second aspect of the present disclosure or any embodiment thereof.

BRIEF DESCRIPTION OF THE DRAWINGS

The present disclosure will be better understood from the following detailed description of embodiments of the present disclosure with reference to the drawings in which same or similar reference numerals indicate same or similar features. For those of ordinary skilled in the art, other drawings may also be obtained from these drawings without inventive efforts.

DETAILED DESCRIPTION

Features and exemplary embodiments of various aspects of the present disclosure will be described in detail below. In order to make the objects, technical solutions and advantages of the present disclosure clear, the present disclosure will be further described in detail below with reference to the drawings and specific embodiments. It should be understood that the specific embodiments described herein are only intended to explain the present disclosure, but not to limit the present disclosure. For those of ordinary skilled in the art, the present disclosure may be implemented without some of those specific details. The following description of the embodiments is only for providing a better understanding of the present disclosure by showing examples of the present disclosure.

It should be noted that, relational terms such as first, second, and the like are used herein merely to distinguish one entity or operation from another without necessarily requiring or implying any such actual relationship or order between such entities or operations. Moreover, the terms "include", "including", or any other variation thereof, are intended to cover a non-exclusive inclusion, such that a(n) process, method, article or device that includes a series of elements not only includes those elements but also includes other elements not explicitly listed or also includes elements inherent to such process, method, article or device. An element preceded by "include . . . " does not, without more constraints, preclude the existence of additional identical elements in the process, method, article or device that includes the element.

Features of various aspects and exemplary embodiments of the present disclosure are described in detail below. In the following detailed description, numerous specific details are presented to provide a thorough understanding of the present disclosure.

Figure 1:
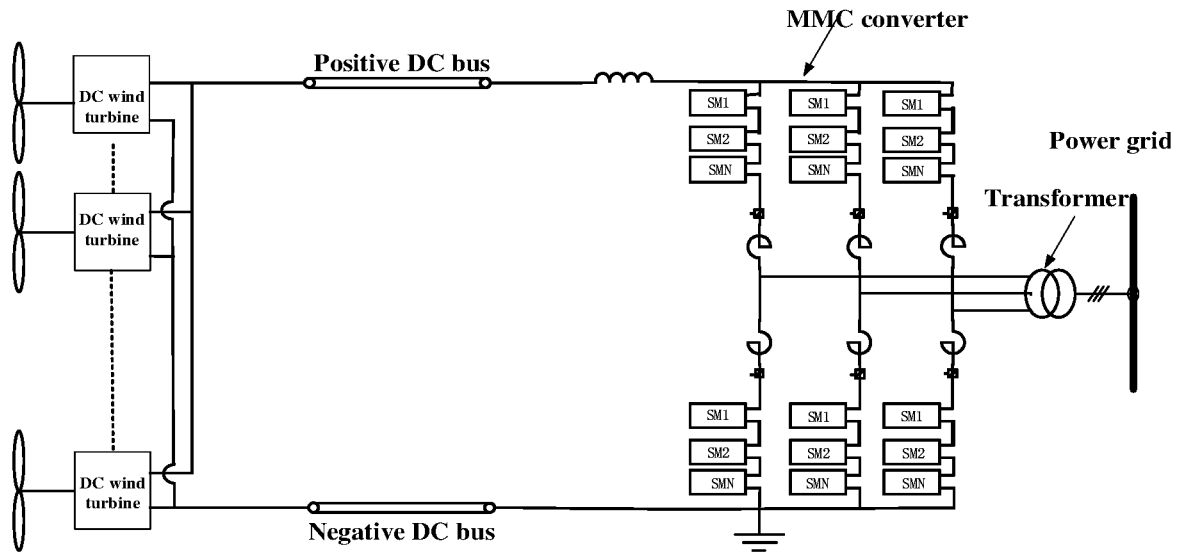
FIG. 1 is a schematic topology diagram of a flexible DC transmission integrated wind farm.
Figure 2:
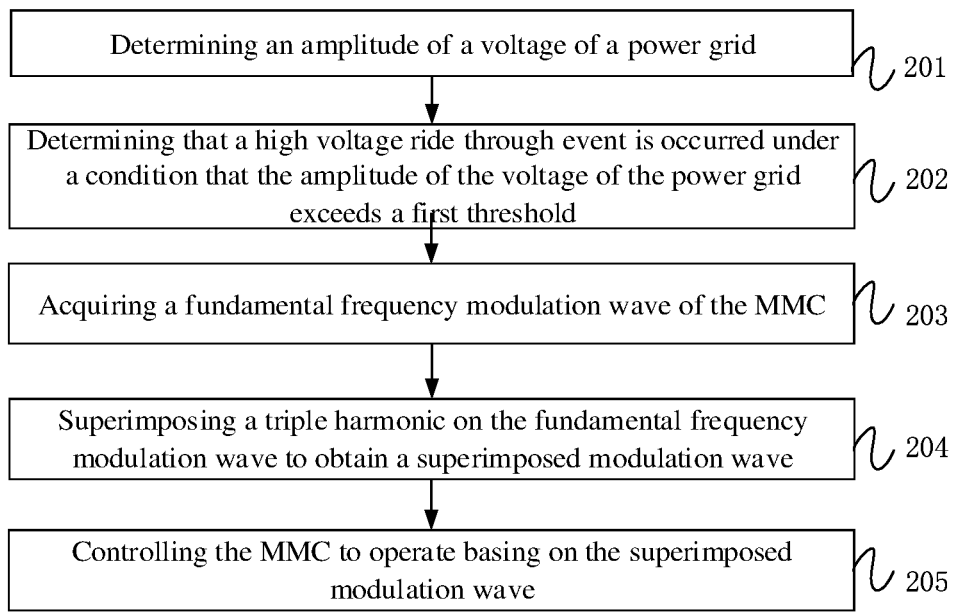
FIG. 2 is a schematic flowchart of a method for controlling high voltage ride through of a wind farm basing on an exemplary embodiment of the present disclosure.

FIG. 2 is a schematic flowchart of a method for controlling high voltage ride through of a wind farm basing on an exemplary embodiment of the present disclosure, which is applied in a MMC connected between DC buses and a power grid of the wind farm (as shown in FIG. 1).

As shown in FIG. 2, the method for controlling high voltage ride through in this embodiment includes steps 201 to 205.

In step 201, an amplitude of a voltage of the power grid is determined.

In step 202, it is determined that a high voltage ride through event is occurred under a condition that the amplitude of the voltage of the power grid exceeds a first threshold.

In step 203, a fundamental frequency modulation wave of the MMC is acquired.

In step 204, a triple harmonic is superimposed on the fundamental frequency modulation wave to obtain a superimposed modulation wave.

In step 205, the MMC is controlled to operate basing on the superimposed modulation wave.

The first threshold may be determined basing on requirements of a standard for high voltage ride through. In an example, when the amplitude of the voltage of the power grid is greater than or equal to 1.1 times of its original value, it is determined that the high voltage ride through event is occurred. In an example, the amplitude of the voltage of the power grid may be represented by a positive-sequence component of the voltage of the power grid, and the amplitude of the voltage of the power grid may be represented by other forms.

Figure 3:
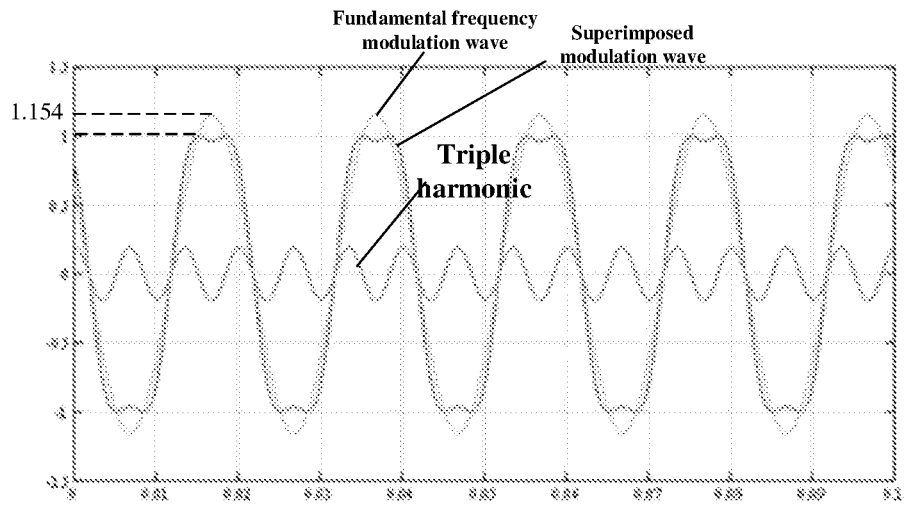
FIG. 3 is a schematic diagram of a triple harmonic being superimposed on a fundamental frequency modulation wave basing on an exemplary embodiment of the present disclosure.

In an example, referring to FIG. 3, the fundamental frequency modulation wave $U_{\alpha 1}$ may be a sine wave, and may be determined basing on a degree of modulation, a rotation angle and an initial phase angle. It is expressed by the formula (1):

$$U_{\alpha 1}=M\cos(\theta+\alpha) \qquad (1)$$

Correspondingly, the triple harmonic $U_{3rd}$ may be determined basing on a coefficient for the triple harmonic, the degree of modulation, the rotation angle and the initial phase angle. It is expressed by the formula (2):

$$U_{3rd}=k\times M\times\cos(3(\theta+\alpha)) \qquad (2)$$

where k is the coefficient for the triple harmonic, M is the degree of modulation, θ is the rotation angle, and αθ is the initial phase angle.

In some embodiments, the fundamental frequency modulation wave may also adopt other waveforms depending on actual requirements of the MMC.

When the flexible DC power grid adopts a sine wave modulation mode, the degree of modulation is in a range of [0, 1], and a maximum amplitude of the modulation wave may be 1. In this case, a fundamental frequency amplitude of an output phase voltage is Udc/2, and a fundamental frequency amplitude of an output line voltage is $\sqrt{3}UDC/2$, where Udc is the DC voltage. A ratio of a peak value of the line voltage to the DC voltage may be calculated basing on a common method: $(\sqrt{3}/Udc/2)/Udc=0.866$. That is, a maximum utilization rate of the DC voltage may reach up to 0.866.

Referring to FIG. 3, the superimposed modulation wave has a saddle shape. On the premise that a peak value of the superimposed modulation wave is not greater than 1, the fundamental frequency amplitude may reach up to $2/\sqrt{3}Udc$, and in this case, the output phase voltage is $(2/\sqrt{3})\times(Udc/2)$, and the fundamental frequency amplitude of the output line voltage is $\sqrt{3}\times(2/\sqrt{3})\times(Udc/2)$. A ratio of a peak value of the line voltage to the DC voltage may be calculated basing on a common method: $(\sqrt{3}\times(2/\sqrt{3})\times(Udc/2)/Udc=1$. That is, a maximum utilization rate of the DC voltage may reach up to 1.

Therefore, after superimposing the triple harmonic on the fundamental frequency modulation wave, the maximum utilization rate of the DC voltage may reach up to 1. Under a condition that the voltage of the DC bus remains unchanged, such improved utilization rate of the DC voltage may improve a voltage at an Alternating Current (AC) output of the MMC to match an increased voltage of the power grid during high voltage ride through, so that successful high voltage ride through of the wind farm can be ensured.

In addition, since the voltage of the DC bus will increase during high voltage ride through, if the fundamental frequency modulation wave is not adjusted, an over-modulation may be easily caused, resulting in fluctuation, distortion or divergence in a current at the AC output of the MMC. Since the amplitude of the superimposed saddle-shaped modulation wave is smaller than the amplitude of the fundamental frequency modulation wave, the over-modulation can be suppressed.

In some embodiments, the formula (1) and formula (2) may be combined to obtain a formula (3):

$$U_\alpha=U_{\alpha 1}+U_{3rd}=M\cos(\theta+\alpha)+kM\cos(3\theta+3\alpha)) \qquad (3)$$

Taking derivative of θ in the formula (3), and setting it to 0 a formula (4) is obtained:

$$-M\sin(\theta+\alpha)-3Mk\sin(3\alpha+3\theta)=0 \qquad (4)$$

Solving the formula (4), a formula (5) is obtained:

$$\theta=-\alpha-a\cos\left(\frac{\sqrt{\frac{3k-1}{3k}}}{2}\right) \qquad (5)$$

Substituting θ into the formula (3), and getting an extreme value for $U_\alpha$, it obtains:

$$U_a=\frac{\sqrt{3}M(3k-1)\sqrt{\frac{3k-1}{k}}}{9} \qquad (6)$$

Taking the derivative of the formula (6) and setting it to 0, k=−⅙ is obtained.

That is, when k=−⅙, $U_\alpha$ gets a minimum value $\sqrt{3}M/2$, the degree of modulation is the largest, which reaches $2/\sqrt{3}$, and a final modulation wave is $U_\alpha=M\cos(\theta+\alpha)-⅙M\cos(3\theta+3\alpha))$.

In some embodiments, a set value for the voltage across the DC buses for the MMC may be increased to raise the voltage across the DC buses to match an increased voltage of the power grid during high voltage ride through, so as to ensure successful high voltage ride through of the wind farm.

Specifically, a set value for the voltage across the DC buses is increased and is input to a DC bus voltage controller (such as a PI regulator) together with a measured value of the voltage across the DC buses, and the fundamental frequency modulation wave of the MMC may be regulated by an output of the DC bus voltage controller so as to realize a closed-loop control of the voltage across the DC buses.

Further, the triple harmonic may be superimposed on the fundamental frequency modulation wave after the closed-loop regulation by the DC bus voltage controller to obtain the superimposed modulation wave, thereby further ensuring successful high voltage ride through of the wind farm by two aspects, i.e., improving the utilization rate of the voltage across the DC buses and raising the voltage across the DC buses.

Figure 4:
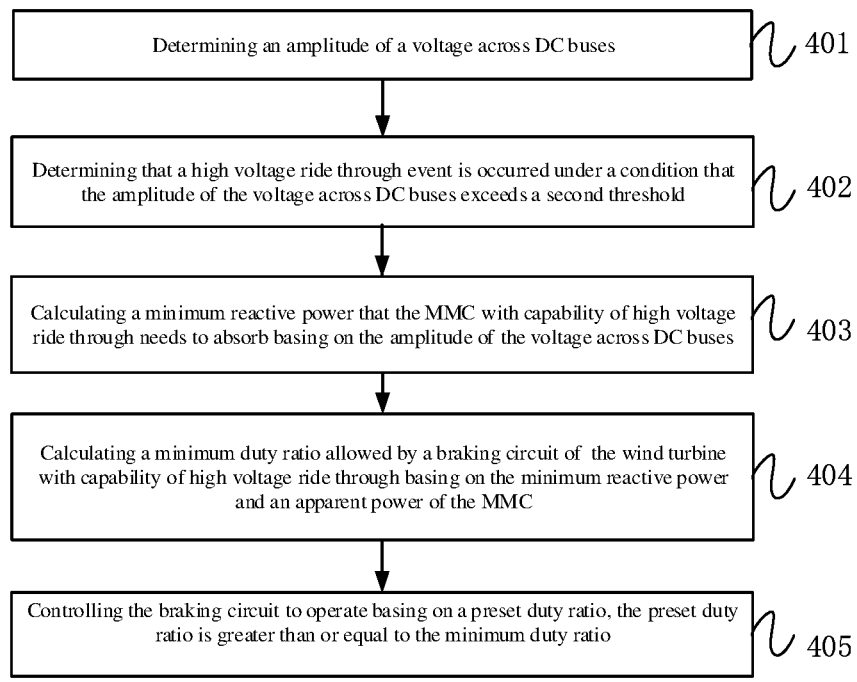
FIG. 4 is a schematic flowchart of a method for controlling high voltage ride through of a wind farm basing on an exemplary embodiment of the present disclosure.

FIG. 4 is a schematic flowchart of a method for controlling high voltage ride through for a wind farm basing on an exemplary embodiment of the present disclosure. The method for controlling high voltage ride through is applied in a machine-side converter of a wind turbine, wherein an output terminal of the machine-side converter is connected to DC buses of the wind farm. As shown in FIG. 4, the method for controlling high voltage ride through in this embodiment includes steps 401 to 405.

In the step 401, an amplitude of a voltage across the DC buses is determined.

In the step 402, it is determined that a high voltage ride through event is occurred under a condition that the amplitude of the voltage across the DC buses exceeds a second threshold.

In the step 403, a minimum reactive power that the MMC with capability of high voltage ride through needs to absorb is calculated basing on an amplitude of the voltage across the DC buses.

In the step 404, a minimum duty ratio allowed by a braking circuit of the machine-side converter with capability of high voltage ride through is calculated basing on the minimum reactive power and an apparent power of the MMC.

In the step 405, the braking circuit is controlled to operate basing on a preset duty ratio, wherein the preset duty ratio is greater than or equal to the minimum duty ratio.

In some embodiments, during high voltage ride through, the voltage across the DC buses of the wind farm will be raised, and the second threshold may be determined basing on requirements of a standard for high voltage ride through.

In one example, a relationship between the voltage of the power grid voltage and the voltage across the DC buses is as follows:

$$U_{dref}=0.1667 \times u_d + 0.8333 \tag{7}$$

where $u_d$ is an amplitude of the voltage of the power grid $U_{dref}$ is an amplitude of the voltage across the DC buses. The amplitude in this embodiment may be understood as a per-unit value.

Taking it is determined that the high voltage ride through event is occurred when $u_d \geq 1.1$ as an example, $U_{dref}=1.01667$ is obtained by substituting 1.1 into the above formula (7). Correspondingly, if $U_{dref} \geq 1.01667$, it may be determined that the high voltage ride through event is occurred.

Basing on the exemplary embodiment of the present disclosure, even if there is no communication between the MMC converter and the machine-side converter, the machine-side converter is able to determine the high voltage ride through state by collecting the voltage across the DC buses. In addition, during the high voltage ride through, a maximum output power allowed by the wind turbine can be calculated basing on the increased value of the voltage across the DC buses, and a minimum duty ratio allowed by the braking circuit of the machine-side converter can be calculated. Therefore, it ensures that the MMC can absorb inductive reactive power basing on requirements of a standard for high voltage ride through while consuming excess energy accumulated by the voltage across the DC buses during the high voltage ride through, thereby ensuring successful high voltage ride through.

In some embodiments, the calculating the minimum reactive power that the MMC with capability of high voltage ride through needs to absorb include step S1 and step S2.

In the step S1, a minimum reactive current that the MMC with capability of high voltage ride through needs to absorb is acquired.

In the step S2, a product of the amplitude of the voltage of the DC buses, the minimum reactive current and the apparent power of the MMC is calculated, and the product is determined as the minimum reactive power that the MMC with capability of high voltage ride through needs to absorb.

Specifically, the minimum reactive power $Q_{min}$ that the MMC with capability of high voltage ride through needs to absorb may be expressed as follows:

$$Q_{min}=u_d \times I_{qref} \times S \tag{8}$$

where $u_d$ is the amplitude of the voltage of the power grid, $I_{qref}$ is the minimum reactive current that the power grid-side converter with capability of high voltage ride through needs to absorb, and S is the apparent power of the MMC.

Taking it is determined that the high voltage ride through event is occurred when $u_d \geq 1.1$ as an example.

In some embodiments, $I_{qref}$ may be expressed as $1.5 \times (u_d - 1.1)$.

In some embodiments, $I_{qref}$ may be expressed as $1.5 \times (u_d - 1.08)$, which is higher than that required for the high voltage ride through to further ensure successful high voltage ride through.

In some embodiments, the calculating the minimum duty ratio allowed by the braking circuit of the machine-side converter with capability of high voltage ride through includes step S3 to step S5.

In step S3, a maximum active power allowed to be output by the machine-side converter of the wind turbine for the high voltage ride through is calculated basing on the minimum reactive power that the MMC with capability of high voltage ride through needs to absorb and the apparent power of the MMC.

In step S4, a ratio of the maximum active power to the apparent power of the MMC is calculated.

In step S5, the minimum duty ratio allowed by the braking circuit of the machine-side converter with capability of high voltage ride through is determined basing on the ratio.

Specifically, the maximum active power $P_{max}$ allowed to be output by the converter of the wind turbine when the high voltage ride through condition is satisfied may be expressed as follows:

$$P_{max}=\sqrt{S^2-Q_{min}^2} \tag{9}$$

Specifically, the minimum duty ratio $D_{min}$ allowed by the braking circuit for the high voltage ride through may be expressed as follows:

$$D_{min}=1-\frac{P_{max}}{S} \tag{10}$$

It should be noted that, during high voltage ride through, the method for controlling high voltage ride through (as shown in FIG. 4), which is applied in the machine-side converter of the wind turbine, may be performed simultaneously or later than the method for controlling high voltage ride through (as shown in FIG. 2) applied in the MMC, which is not limited here.

Figure 5:
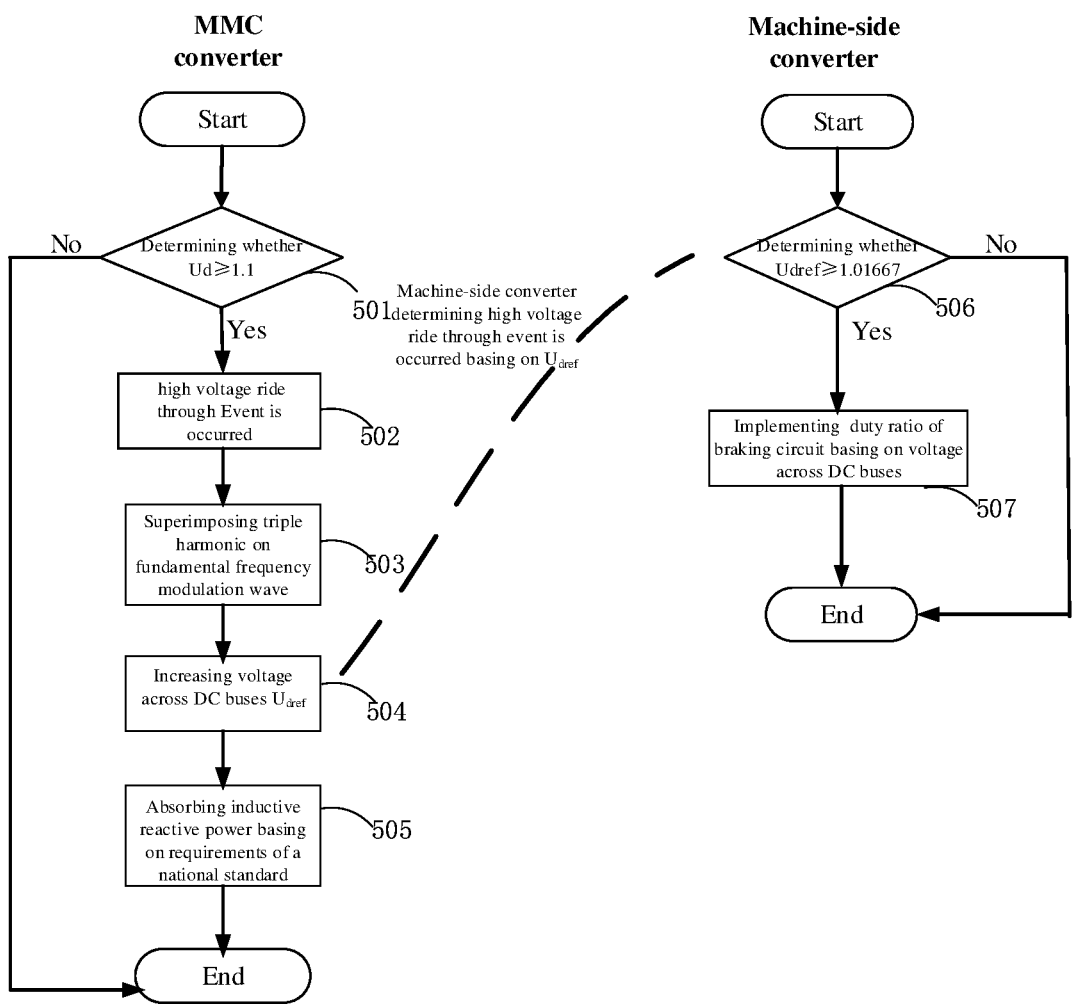
FIG. 5 is a schematic flowchart of a method for controlling high voltage ride through of a wind farm basing on an exemplary embodiment of the present disclosure.

FIG. 5 is a schematic flowchart of a method for controlling high voltage ride through for a wind farm basing on an exemplary embodiment of the present disclosure, which is applicable to implement a high voltage ride through control strategy for the wind farm through an interaction between an MMC converter and a machine-side converter. As shown in FIG. 5, the method for controlling high voltage ride through in this embodiment includes steps 501 to 507.

The steps 501 to 505 are performed by the MMC converter.

In the step 501, an amplitude $u_d$ of a voltage at a power grid is detected and whether $u_d \geq 1.1$ is determined. If yes, it means that the MMC converter enters a high voltage ride through state, otherwise, the process proceeds to the end.

In the step 502, it is determined that the MMC converter enters the high voltage ride through state.

In the step 503, a triple harmonic is superimposed on a fundamental frequency modulation wave to improve a utilization rate of the DC voltage. A voltage at an AC output of the MMC is improved to match an increased voltage of the power grid during high voltage ride through, and moreover, over-modulation is suppressed to ensure successful high voltage ride through of the wind farm.

In the step 504, the voltage across the DC buses $U_{dref}$ is raised to match the increased voltage of the power grid during the high voltage ride through to ensure successful high voltage ride through of the wind farm.

In the step 505, the MMC converter is controlled to absorb inductive reactive power basing on requirements of a national standard.

This exemplary embodiment of the present disclosure does not limit the order of the step 503 and the step 504. The step 506 may be performed after the step 504. The steps 506 and 507 are performed by the machine-side converter of the wind turbine.

In the step 506, the voltage across the DC buses $U_{dref}$ is detected, and whether $U_{dref} \geq 1.01667$ is determined. If yes, it means that the MMC converter enters the high voltage ride through state, otherwise, the method proceeds to the end.

In the step 507, the duty ratio of a braking resistance is implemented basing on the voltage across the DC buses.

With the method for controlling high voltage ride through in the exemplary embodiment of the present disclosure, even if there is no communication between the MMC converter and the machine-side converter, the machine-side converter may is able to determine the high voltage ride through state by collecting the voltage $U_{dref}$ across the DC buses. In addition, during the high voltage ride through, a maximum output power allowed by the wind turbine can be calculated basing on an increased value of the voltage across the DC bus, and a minimum duty ratio allowed by the braking circuit of the machine-side converter can be calculated. Therefore, it ensures that the MMC can absorb inductive reactive power basing on requirements of a standard for high voltage ride through while consuming excess energy accumulated by the voltage across the DC buses during the high voltage ride through, thereby ensuring successful high voltage ride through.

Figure 6:
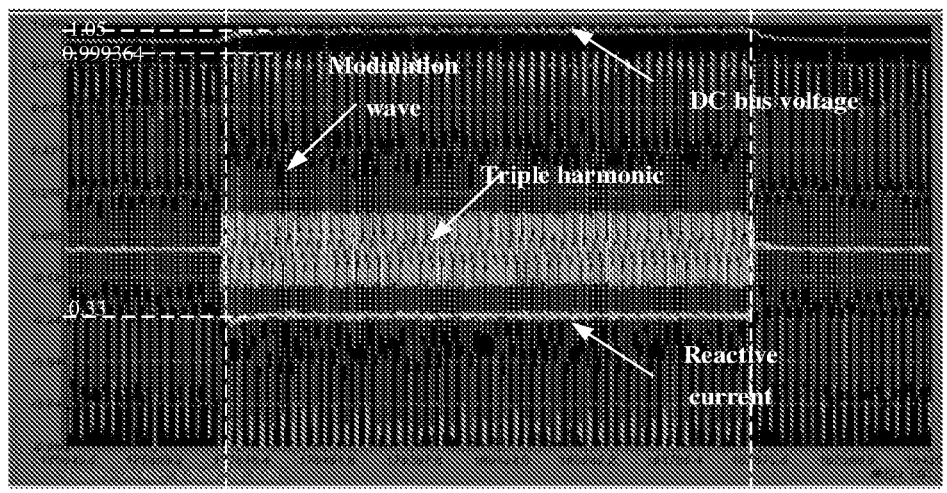
FIG. 6 is a schematic simulation diagram of a voltage across the DC buses, a triple harmonic, a reactive current and a modulation wave during high voltage ride through basing on an exemplary embodiment of the present disclosure.
Figure 7:
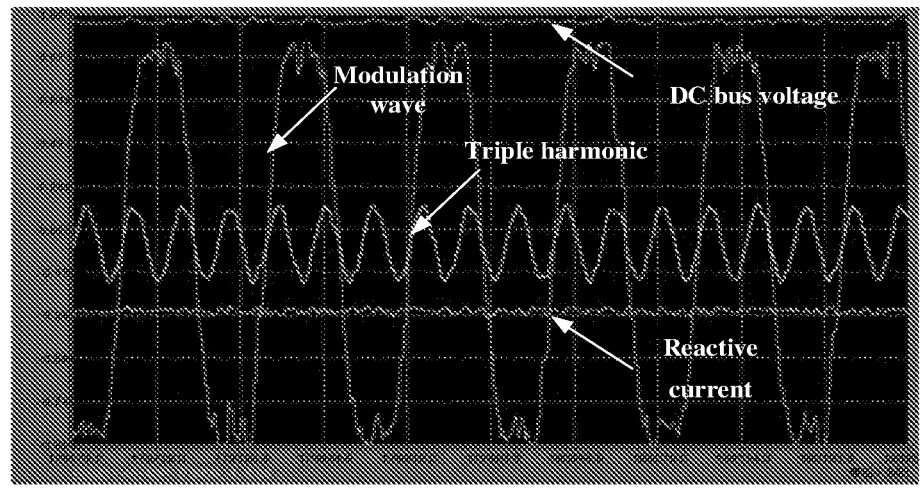
FIG. 7 is a partial enlarged diagram of FIG. 6.

FIGS. 6 to 9 are schematic simulation diagrams when a capacity of the MMC converter is 25 Mvar and the voltage of the power grid is increased to 1.3 times of its original voltage and FIG. 7 is a partial enlarged diagram of FIG. 6.

Referring to FIGS. 6 and 7, substituting $u_d=1.3$ into the formula (7), $U_{dref}=1.05$ is obtained. That is, the MMC may raise the voltage across the DC buses $U_{dref}$ to 1.05 times of its original value.

Referring to FIGS. 6 and 7, substituting $u_d=1.3$ into an expression $1.5 \times (u_d-1.08)$, the minimum reactive current $I_{q\_ref}$, i.e. 0.33, that the MMC with capability of high voltage ride through needs to absorb is obtained.

Substituting $I_{qref}=0.33$, $u_d=1.3$, and S=25 into the formula (8), the minimum reactive power $Q_{min}$, i.e. 10.725 MVar, that the MMC with capability of high voltage ride through needs to absorb is obtained.

Still referring to FIG. 6 and FIG. 7, after the triple harmonic is superimposed, the maximum amplitude of the modulation wave is 0.999364, which is less than 1, and indicates there is no over-modulation.

Figure 8:
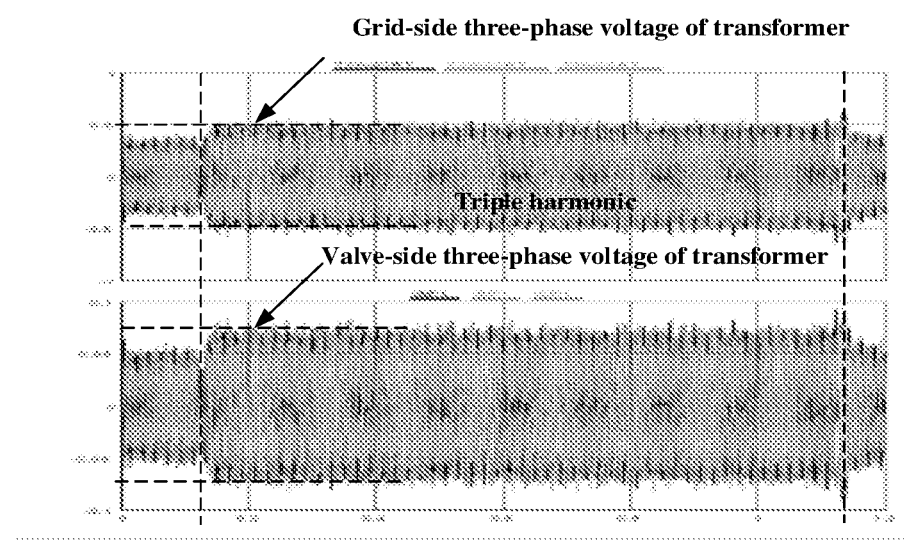
FIG. 8 is a schematic simulation diagram of a grid-side voltage and a valve-side voltage of a transformer during a high voltage ride through period basing on an exemplary embodiment of the present disclosure.
Figure 9:
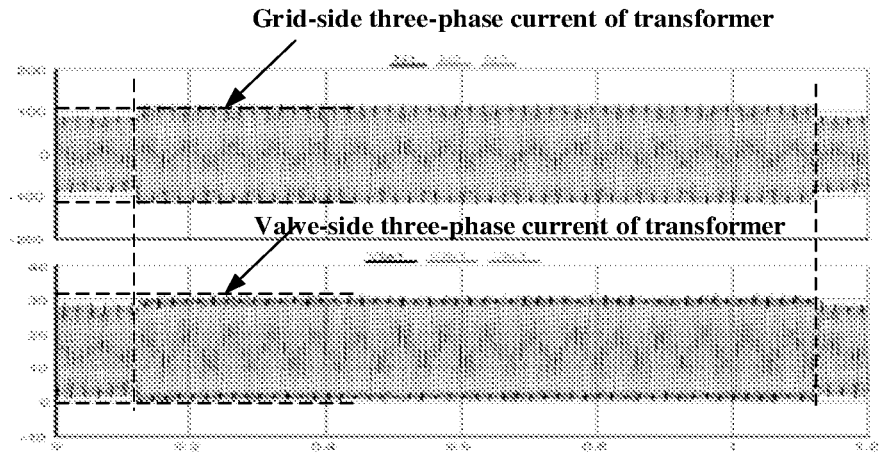
FIG. 9 is a schematic simulation diagram of a grid-side current and a valve-side current of a transformer during a high voltage ride through period basing on y an exemplary embodiment of the present disclosure.

Further, referring to FIG. 8, after the triple harmonic is superimposed, there is no overvoltage, distortion, or divergence in the valve-side voltage and the grid-side voltage of the transformer, and there is no over-modulation during the high voltage ride through. Similarly, referring to FIG. 9, after the triple harmonic is superimposed, there is no overcurrent, distortion, or divergence on the valve-side current and the grid-side current of the transformer, and there is no over-modulation during the high voltage ride through. Therefore, the high voltage ride through can be realized.

Figure 10:
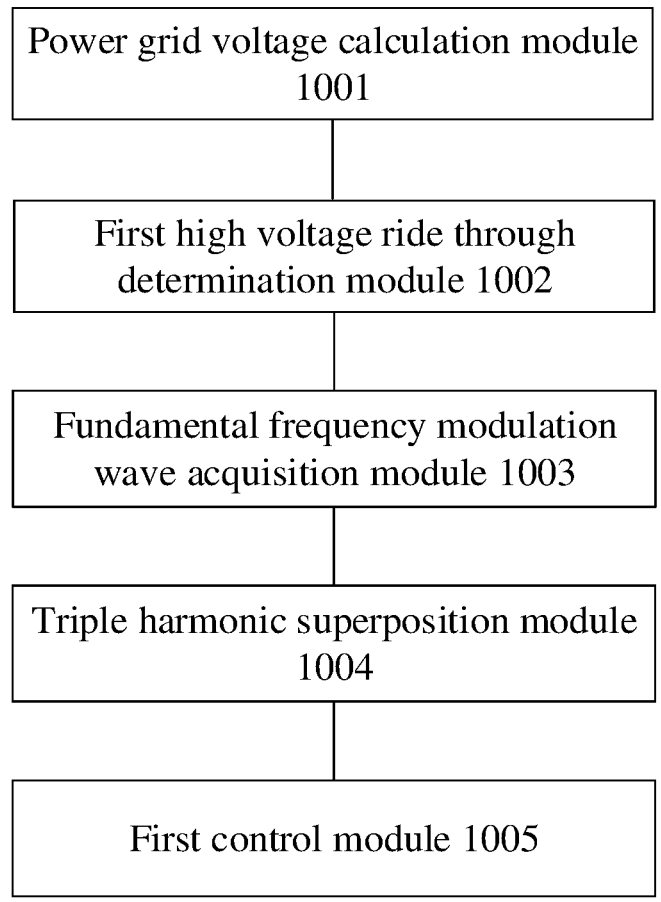
FIG. 10 is a schematic structural diagram of a MMC basing on an exemplary embodiment of the present disclosure.

FIG. 10 is a schematic structural diagram of a MMC basing on an exemplary embodiment of the present disclosure, and the descriptions for FIG. 2 is applicable to this embodiment. As shown in FIG. 10, the MMC includes: a power grid voltage calculation module 1001 (which may have a function corresponding to the step 201), a first high voltage ride through determination module 1002 (which may have a function corresponding to the step 202), a fundamental frequency modulation wave acquisition module 1003 (which may have a function corresponding to the step 203), a triple harmonic superposition module 1004 (which may have a function corresponding to the step 204), and a first control module 1005 (which may have a function corresponding to the step 205).

The power grid voltage calculation module 1001 is configured to determine an amplitude of a voltage of the power grid.

The first high voltage ride through determination module 1002 is configured to determine that a high voltage ride through event is occurred under a condition that the amplitude of the voltage of the power grid exceeds a first threshold.

The fundamental frequency modulation wave acquisition module 1003 is configured to acquire a fundamental frequency modulation wave of the MMC.

The triple harmonic superposition module 1004 is configured to superimpose a triple harmonic on the fundamental frequency modulation wave to obtain a superimposed modulation wave.

The first control module 1005 is configured to control the MMC to operate basing on the superimposed modulation wave.

In some embodiments, the triple harmonic superposition module 1004 is specifically configured to: increase a set value for the voltage across the DC buses to raise the voltage across the DC buses after determining that the high voltage ride through event is occurred; adjust the fundamental frequency modulation wave of the machine-side converter basing on the increased set value for the voltage across the DC buses and a measured value of the voltage across the DC buses to obtain an adjusted fundamental frequency modulation wave; and superimpose the triple harmonic on the adjusted fundamental frequency modulation wave of the machine-side converter to obtain the superimposed modulation wave.

Basing on the exemplary embodiment of the present disclosure, during the high voltage ride through, after superimposing the triple harmonic on the fundamental frequency modulation wave, a utilization rate of the DC voltage can reach up to 1. Under a condition that the voltage across the DC buses remains unchanged, such improved utilization rate of the DC voltage can cause a voltage at an AC output of the MMC to be increased to match the increased voltage of the power grid during the high voltage ride through, so that successful high voltage ride through of the wind farm is ensured. In addition, since the voltage across the DC buses generally will increase during high voltage ride through, it is easy to cause over-modulation if the fundamental frequency modulation wave is not adjusted, resulting in fluctuation, distortion or divergence in current at the AC output of the MMC. Since the amplitude of the superimposed saddle-shaped modulation wave is smaller than the amplitude of the fundamental frequency modulation wave, the over-modulation problem can be suppressed.

Figure 11:
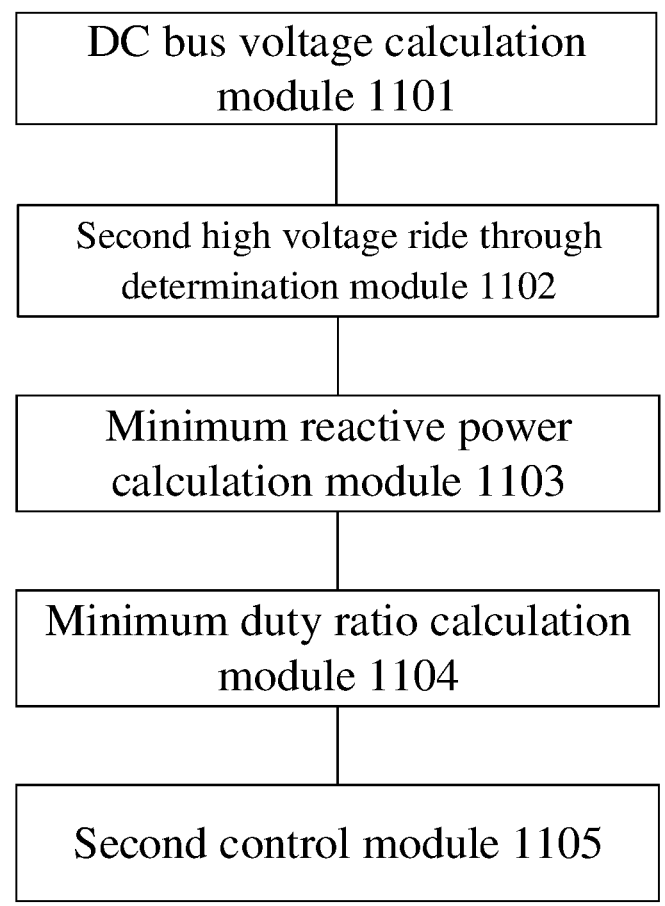
FIG. 11 is a schematic structural diagram of a machine-side converter of a wind turbine basing on an exemplary embodiment of the present disclosure.

FIG. 11 is a schematic structural diagram of a machine-side converter of a wind turbine basing on an exemplary of the present disclosure, and the descriptions for FIG. 4 are applicable to this embodiment. As shown in FIG. 11, the machine-side converter includes: a DC bus voltage calculation module 1101 (which may have a function corresponding to the step 401), a second high voltage ride through determination module 1102 (which may have a function corresponding to the step 402), a minimum reactive power calculation module 1103 (which may have a function corresponding to the step 403), a minimum duty ratio calculation module 1104 (which may have a function corresponding to the step 404), and a second control module 1105 (which may have a function corresponding to the step 405).

The DC bus voltage calculation module 1101 is configured to determine an amplitude of a voltage across DC buses.

The second high voltage ride through determination module 1102 is configured to determine that a high voltage ride through event is occurred under a condition that the amplitude of the voltage across the DC buses exceeds a second threshold.

The minimum reactive power calculation module 1103 is configured to calculate a minimum reactive power that the MMC with capability of high voltage ride through needs to absorb basing on the amplitude of the voltage across the DC buses.

The minimum duty ratio calculation module 1104 is configured to calculate a minimum duty ratio allowed by a braking circuit of the machine-side converter with capability of high voltage ride through according to the minimum reactive power and an apparent power of the MMC.

The second control module 1105 is configured to control the braking circuit to operate basing on a preset duty ratio, wherein the preset duty ratio is greater than or equal to the minimum duty ratio.

Basing on the exemplary embodiment of the present disclosure, even if there is no communication between the MMC converter and the machine-side converter, the machine-side converter is able to determine the high voltage ride through state by collecting the voltage $U_{dref}$ across the DC buses. In addition, during the high voltage ride through, a maximum output power allowed by the wind turbine can be calculated basing on an increased value of the voltage across the DC buses, and a minimum duty ratio allowed by the braking circuit of the machine-side converter can be calculated. Therefore, it ensures that the MMC can absorb inductive reactive power basing on requirements of a standard for high voltage ride through while consuming excess energy accumulated by the voltage across the DC buses during the high voltage ride through, thereby ensuring successful high voltage ride through.

Embodiments of the present disclosure further provide a system for controlling high voltage ride through for a wind farm. The system for controlling high voltage ride through for the wind farm includes the MMC basing on the embodiments of the present disclosure and a plurality of machine-side converters basing on the embodiments of the present disclosure.

Embodiments of the present disclosure further provide a wind farm. The wind farm includes: the MMC basing on the embodiments of the present disclosure and a plurality of wind turbines, wherein at least one of the plurality of wind turbines includes a machine-side converter basing on the embodiments of the present disclosure.

The wind turbine in the exemplary embodiment of the present disclosure may be a DC wind turbine.

Embodiments of the present disclosure further provide a computer-readable storage medium having programs stored thereon, wherein the programs include operation instructions for performing the method for controlling high voltage ride through basing on the embodiments of the present disclosure. In one exemplary embodiment of the present disclosure, the computer-readable storage medium may be a non-transitory readable medium.

It should be clear that, the embodiments in the specification are described in a progressive way, and the same or similar parts of each embodiment may be referred to each other. Each embodiment focuses on the differences with other embodiments. Regarding device embodiments, reference is made to the description of method embodiments. The exemplary embodiment of the present disclosure is not limited to the specific steps and structures described above and shown in the figures. Those skilled in the art may make various changes, modifications and additions, or change the order between steps after understanding the gist of the application. For the sake of brevity, a detailed description of the known method and technology is omitted here.

The functional blocks shown in the above-mentioned structural block diagrams may be implemented as hardware, software, firmware, or a combination thereof. When implemented in hardware, it may be, for example, an electronic circuit, an application specific integrated circuit (ASIC), appropriate firmware, plugins, function cards, and so on. When implemented in software, the elements of the embodiments of the present disclosure are programs or code segments used to perform required tasks. The programs or code segments may be stored in a machine-readable medium, or transmitted on a transmission medium or a communication link through a data signal carried in a carrier wave. "Machine-readable medium" may include any medium that may store or transmit information. Examples of the machine-readable medium include an electronic circuit, a semiconductor memory device, a ROM, a flash memory, an erasable ROM (EROM), a floppy disk, a CD-ROM, an optical disk, a hard disk, a fiber optic medium, a radio frequency (RF) link, and so on. The code segments may be downloaded via a computer network such as the Internet, intranet, and so on.

The embodiments of the present disclosure may be implemented in other specific forms without departing from the spirit and essential characteristics thereof. For example, the algorithms described in specific embodiments may be modified, while system architecture does not depart from the basic spirit of the embodiments of the present disclosure. Accordingly, the present embodiments should be considered in all respects as illustrative rather than restrictive. The scope of the embodiments of the present disclosure is defined by the appended claims rather than the above description. All changes that fall within the meaning of the claims and the equivalents thereof are thus included in the scope of the embodiments of the present disclosure.

What is claimed is:

1. A method for controlling high voltage ride through of a wind farm, the method being applied in a Modular Multilevel Converter (MMC) connected between Direct Current (DC) buses and a power grid of the wind farm, and the method comprising:
   determining an amplitude of a voltage of the power grid;
   determining that a high voltage ride through event is occurred under a condition that the amplitude of the voltage of the power grid exceeds a first threshold;
   increasing a set value for a voltage across the DC buses to raise the voltage across the DC buses;
   acquiring a fundamental frequency modulation wave of the MMC;

adjusting the fundamental frequency modulation wave based on the increased set value for the voltage across the DC buses and a measured value of the voltage across the DC buses;

superimposing a triple harmonic on the adjusted fundamental frequency modulation wave to obtain a superimposed modulation wave; and controlling the MMC to operate based on the superimposed modulation wave.

2. The method according to claim 1, wherein:

the fundamental frequency modulation wave is determined based on a degree of modulation, a rotation angle and an initial phase angle; and the triple harmonic is determined based on a coefficient for the triple harmonic, the degree of modulation, the rotation angle and the initial phase angle.

3. A Modular Multilevel Converter (MMC), comprising modules for performing the steps in the method according to claim 1.

4. A system for controlling high voltage ride through of a wind farm having a plurality of wind turbines, comprising:

the MMC according to claim 3; and a plurality of machine-side converters comprising a machine-side converter which is configured to:

determine an amplitude of a voltage across the DC buses;

determine that a high voltage ride through event is occurred under a condition that the amplitude of the voltage across the DC buses exceeds a second threshold;

calculate, based on the amplitude of the voltage across the DC buses, a minimum reactive power that the MMC with capability of high voltage ride through needs to absorb;

calculate, based on the minimum reactive power and an apparent power of the MMC, a minimum duty ratio allowed by a braking circuit of the machine-side converter with capability of high voltage ride through; and control the braking circuit to operate based on a preset duty ratio, wherein the preset duty ratio is greater than or equal to the minimum duty ratio.

5. A wind farm, comprising:

the MMC according to claim 3; and a plurality of wind turbines, wherein at least one of the plurality of wind turbines comprises a machine-side converter which is configured to:

determine an amplitude of a voltage across the DC buses;

determine that a high voltage ride through event is occurred under a condition that the amplitude of the voltage across the DC buses exceeds a second threshold;

calculate, based on the amplitude of the voltage across the DC buses, a minimum reactive power that the MMC with capability of high voltage ride through needs to absorb;

calculate, based on the minimum reactive power and an apparent power of the MMC, a minimum duty ratio allowed by a braking circuit of the machine-side converter with capability of high voltage ride through; and control the braking circuit to operate based on a preset duty ratio, wherein the preset duty ratio is greater than or equal to the minimum duty ratio.

6. A computer-readable storage medium having programs stored thereon, wherein the programs comprises operation instructions for performing a method for controlling high voltage ride through according to claim 1.

7. A method for controlling high voltage ride through of a wind farm, the wind farm including a Modular Multilevel Converter (MMC) and a machine-side converter of a wind turbine, wherein the machine-side converter is connected to the MMC through Direct Current (DC) buses, and the method comprising:

determining, by the MMC, an amplitude of a voltage of the power grid;

determining, by the MMC, that a high voltage ride through event is occurred under a condition that the amplitude of the voltage of the power grid exceeds a first threshold;

increasing, by the MMC, a set value for a voltage across the DC buses to raise the voltage across the DC buses;

acquiring, by the MMC, a fundamental frequency modulation wave of the MMC;

adjusting, by the MMC, the fundamental frequency modulation wave based on the increased set value for the voltage across the DC buses and a measured value of the voltage across the DC buses;

superimposing, by the MMC, a triple harmonic on the adjusted fundamental frequency modulation wave to obtain a superimposed modulation wave; and, controlling, by the MMC, the MMC to operate based on the superimposed modulation wave;

determining, by the machine-side converter, an amplitude of a voltage across the DC buses;

determining, by the machine-side converter, that a high voltage ride through event is occurred under a condition that the amplitude of the voltage across the DC buses exceeds a second threshold;

calculating, by the machine-side converter, based on the amplitude of the voltage across the DC buses, a minimum reactive power that the MMC with capability of high voltage ride through needs to absorb through;

calculating, by the machine-side converter, based on the minimum reactive power and an apparent power of the MMC, a minimum duty ratio allowed by a braking circuit of the machine-side converter with capability of high voltage ride through; and controlling, by the machine-side converter, the braking circuit to operate based on a preset duty ratio, wherein the preset duty ratio is greater than or equal to the minimum duty ratio.

8. The method according to claim 4, wherein the calculating, according to the amplitude of the voltage across the DC buses, the minimum reactive power that the MMC with capability of high voltage ride through needs to absorb comprises:

acquiring a minimum reactive current that the MMC with capability of high voltage ride through needs to absorb;

calculating a product of the amplitude of the voltage across the DC buses, the minimum reactive current and the apparent power of the MMC; and determining the product as the minimum reactive power that the MMC with capability of high voltage ride through needs to absorb.

9. The method according to claim 7, wherein the calculating, based on the minimum reactive power and the apparent power of the MMC, the minimum duty ratio allowed by the braking circuit of the machine-side converter with capability of high voltage ride through comprises:

calculating, based on the minimum reactive power and the apparent power of the MMC, a maximum active power allowed to be output by the machine-side converter of the wind turbine with capability of high voltage ride through;

calculating a ratio of the maximum active power to the apparent power of the MMC; and determining, based on the ratio, the minimum duty ratio allowed by the braking circuit of the machine-side converter with capability of high voltage ride through.

10. A machine-side converter of a wind turbine, comprising modules for performing the steps in the method according to claim 7.

11. A computer-readable storage medium having programs stored thereon, wherein the programs comprises operation instructions for performing a method for controlling high voltage ride through according to claim 7.

* * * * *